Aug. 15, 1944.　　　C. S. ASH　　　2,355,942
WHEEL
Filed Nov. 3, 1942　　　2 Sheets-Sheet 1
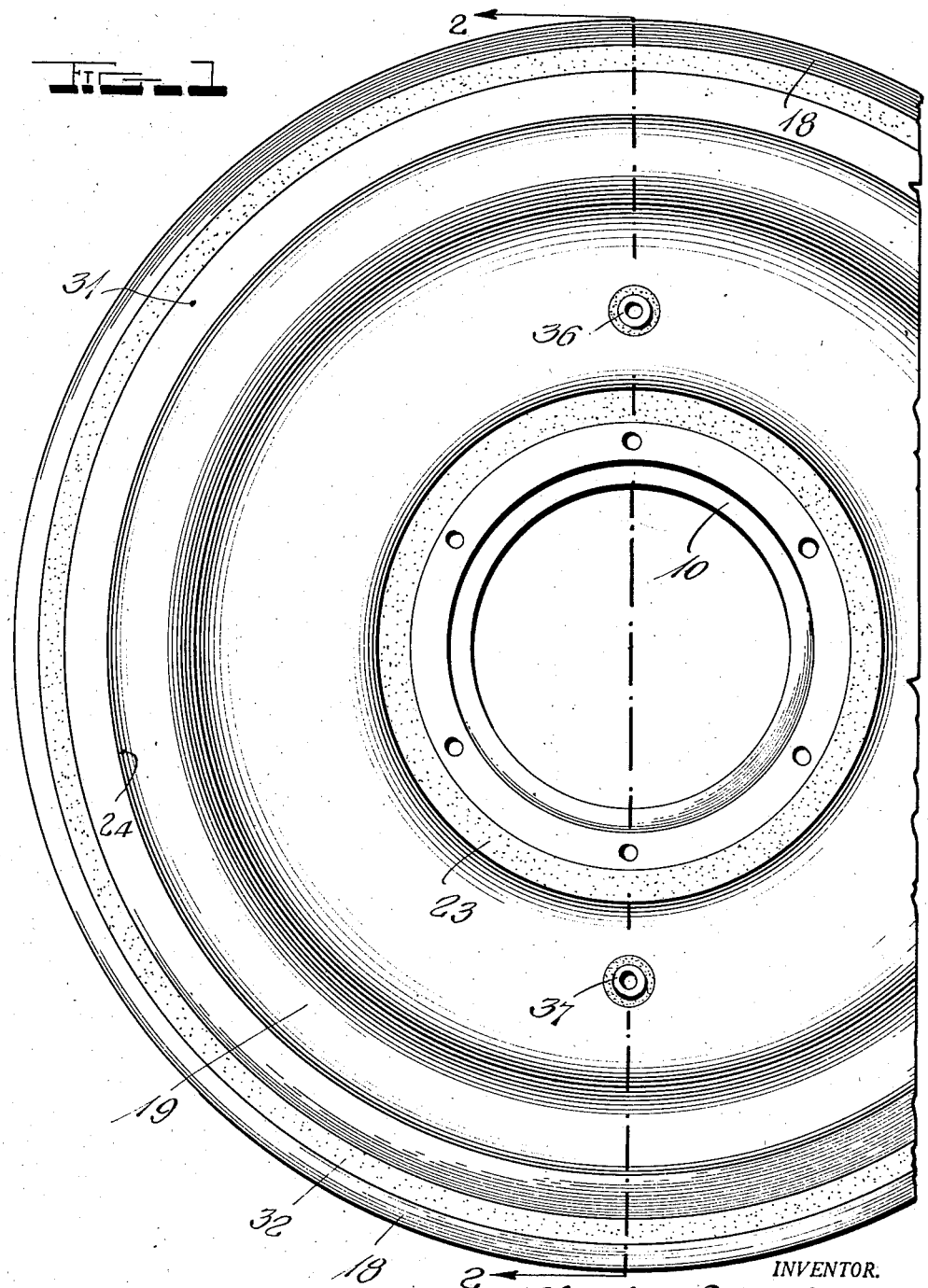
INVENTOR.
Charles S. Ash,
BY
Hobert N. Winham
attorney Aug. 15, 1944.  C. S. ASH  2,355,942
WHEEL
Filed Nov. 3, 1942   2 Sheets-Sheet 2
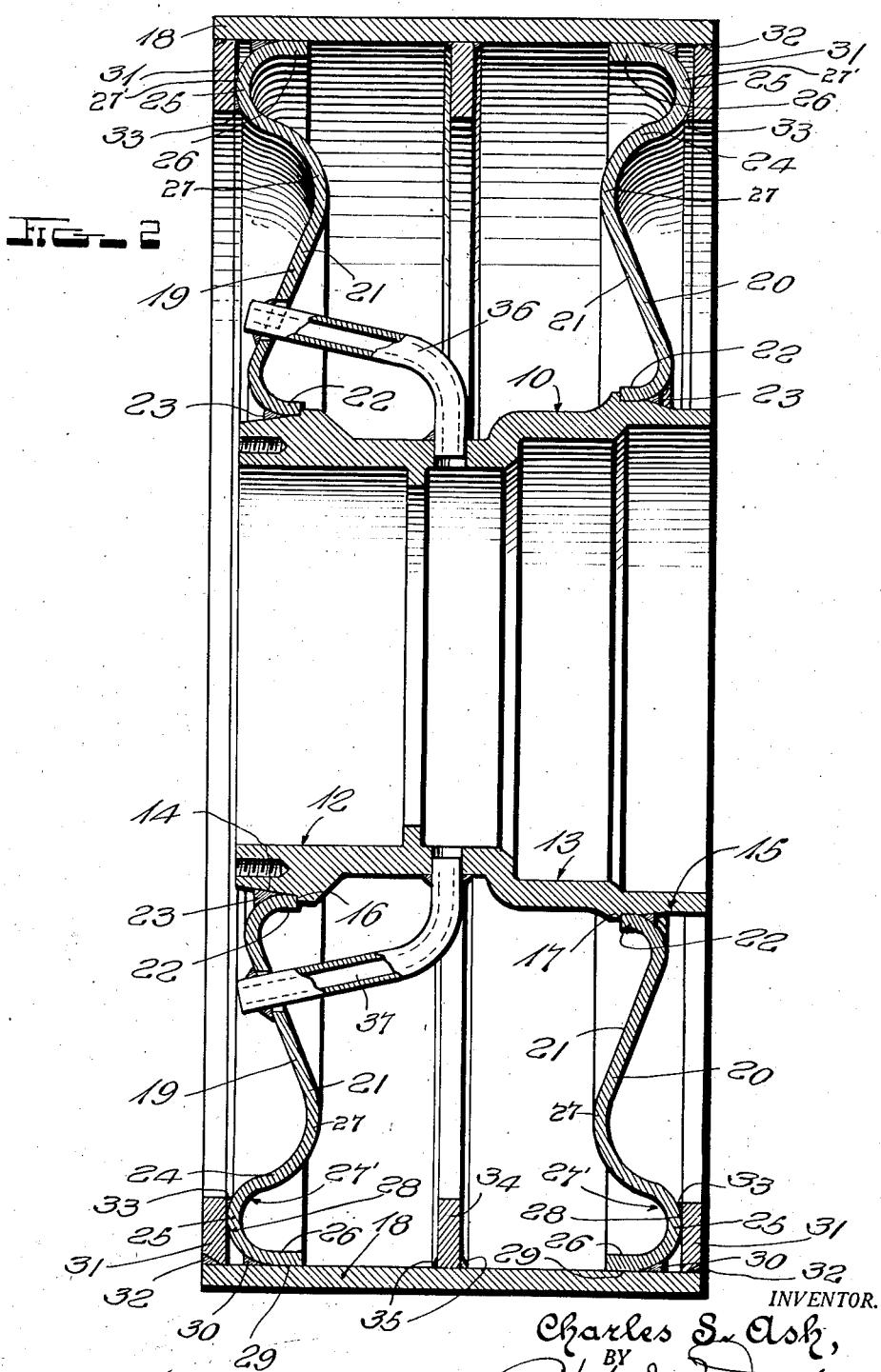
INVENTOR.
Charles S. Ash,
BY Hobart N. Witham
Attorney Patented Aug. 15, 1944

2,355,942

UNITED STATES PATENT OFFICE 2,355,942

WHEEL

Charles S. Ash, Milford, Mich.

Application November 3, 1942, Serial No. 464,329

4 Claims. (Cl. 305—1)

The present invention relates to new and useful improvements in wheels, and particularly idler and bogie wheels for tanks and other vehicles having endless tracks.

Objects and advantages of the invention will be set forth in part hereinafter and in part will be obvious herefrom, or may be learned by practice with the invention, the same being realized and attained by means of the instrumentalities and combinations pointed out in the appended claims.

The invention consists in the novel parts, constructions, arrangements, combinations and improvements herein shown and described.

The accompanying drawings referred to herein, and constituting a part hereof, discloses an exemplificate embodiment of the invention, and, together with the description, serves to explain the principle thereof.

In the said drawings:

Fig. 1 is a side elevation of a wheel structure embodying the novel features of the invention.

Fig. 2 is a section on the line 2—2 of Fig. 1 through the wheel structure.

The present invention has for its object the provision of an improved, simplified and strengthened tank wheel, the principles of which may be embodied in either a bogie wheel or idler wheel, which can be manufactured at a minimum of cost. A further object is the provision of a tank wheel which will collect little mud or debris in running and which will retain its strength to a high degree when partially demolished. Still another object is the provision of a wheel for tanks and other vehicles which can be made principally from simple, substantially duplicate drawn parts or stampings, and can be assembled quickly and efficiently by welding. Still another object is the provision of a wheel for tanks which is so constructed as to have maximum strength to withstand great strains from without, thus adapting it for highly efficient use as an idler wheel on which heavy strains fall.

The drawings show a wheel without a wear band or tire, but it is to be understood that it may be provided, if desired or required, with a wear band or tire of suitable type to serve the purpose for which it is designed in use.

As shown, the wheel comprises a tubular hub member 10 which has its ends interiorly finished to provide bearing seats 12 and 13 and has its outer surface chamfered adjacent its ends to provide abutment or seat surfaces 14 and 15 and associated shoulders 16 and 17. The tire support comprises a hollow cylindrical member or rim 18 which may be formed from a steel tube of the proper diameter and which is of a width approximately the same as the length of the hub 10.

Means are provided for rigidly supporting the cylindrical rim 18 on the hub member 10, and these means comprise a pair of dished disks or load carrying members 19 and 20 arranged at opposite sides of the wheel and extending between the hub and rim and connecting the same with each other. Each disk has a frusto-conical body portion 21 provided at its center or apex with a circular flange or sleeve 22 extending inwardly or toward the center of the wheel. The flanges or sleeves 22 of the respective disks are press-fitted tightly upon the seat surfaces 14 and 15 of the hub and abut against the shoulders 16 and 17 and are tack welded to the hub, as shown at 23.

From the sleeves 22 the frustoconical body portions proper of the disks 19 and 20 extend in converging relation inwardly and toward the rim 18 to a point approximately three-quarters of the distance between the hub and the rim. Beyond this point and between the same and their peripheral edges the disks are first bent outward laterally, as at 24, toward the adjacent side of the wheel, thence radially outward or toward the rim, as at 25, and thence laterally inward or toward the wheel center, as at 26. These bends are on curved lines and form circumferentially extending channeled reinforcing rib portions 27 and 27', the former having their open or concaved sides facing outwardly or toward the sides of the wheel and their closed or convex sides facing inwardly or toward the wheel center and the latter having their open or concaved sides facing inwardly or toward the wheel center and their closed or convex sides facing outwardly or toward the sides of the wheel. The construction of these portions is such as to provide self reinforced relatively deep and wide supports presenting outer abutment or seat surfaces 28 at the sides of the wheel and transverse abutment or seat surfaces 29 at the periphery of the wheel body.

The rim 18 rests on and is supported by the seat surfaces 29 which it engages with a tight press fit, the rim being rigidly fixed to said surfaces by tack welding, as shown at 30. Stiffening rings 31 reinforce the marginal edges of the rim 18 and the disk portions 27 and bear against the seat surfaces 28, said rings being rigidly fixed in position by tack welding them to the rim, as shown at 32, and tack welding them to the disk portions 27, as shown at 33. A stiffening rim 34 is also preferably employed on the interior of the rim 18 to stiffen it at its center, and this ring 34 is tack welded to the rim, as shown at 35. This construction, arrangement and mode of connection of the parts provides a wheel of great strength and resistance to compression and formed of simple, substantially duplicate drawn or stamped parts which can be easily, conveniently and quickly assembled and rigidly united by welding. It will be observed that the body portions of the conical disks diverge outwardly toward the hub and opposite sides of the wheel on straight lines while the portions 24, 25 and 26 are sinuous curved, thereby further adding to the strength of the wheel and at the same time reducing the extent of surfaces on which mud or other debris may collect. It will also be observed that the parts are so connected as to mutually reinforce each other and to be so firmly bound together that the wheel may be damaged or even partially demolished without rendering it incapable of further use.

One of the conical disk members is apertured to receive grease fittings 36 and 37 disposed diametrically opposite each other and fitted into grease holes extending into the interior of the hub. These fittings are preferably welded to the disk and hub. One of the fittings is designed to serve as a grease supply fitting and the other as a grease relief fitting allowing excess grease to escape, and such fittings may be suitably check valved or otherwise constructed to serve these respective purposes.

In practice the parts may be assembled in a convenient manner by first welding the grease fittings to the hub, then forcing the disk 19 on the hub and welding it to the hub and grease fittings, then forcing the rim 18 with the ring 34 previously applied thereto over upon the disk 19 and welding it thereto, then forcing the disk 20 onto the hub and into the rim 18 and welding it thereto, and finally applying and welding the rings 31 in place.

The members 19 and 20 are preferably formed by stamping and drawing operations and when so formed each is made from a single flat circular disk of metal. The central portion of the disk is pressed, bent and drawn in one direction to form the tubular portion 22, the conical portion 21 is bent from the flat disk, and the portions 27 are likewise bent and drawn in the direction opposite the tubular portion 22. In this way, the portions 21 and 22 are left in a state of tension, while the portions 27 are left in a compressed state, thereby greatly increasing the stability of the wheel body, the parts of which are bound in such states by the tightly pressed on and welded rim 18. The rim 18, as stated, may be provided or not with a wear band or tire of suitable type, according to the use to which it is to be put.

The great advantage of my improved wheel construction is that it may be used either as a bogie or idler wheel for tanks, that it is light in weight yet of maximum strength to effectually withstand the strains to which such wheels are subjected, and that the amount of material and welding required to make a strong wheel are reduced, thus securing economy of manufacture, and that the parts required are substantially duplicates and may be readily and quickly assembled to produce the wheel. As in service the two disks 19 and 20 are protected from excessive wear by the rings 31, which serve as wear rings as well as stiffening rings, the disks may be made of commercial metal which may be easily stamped and drawn.

Having thus described my invention, I claim:

1. A wheel of the character described comprising a hub, a cylindrical rim band, a pair of conical disks formed independent of the rim and arranged between the hub and rim, one on each side of the vertical center of the wheel, said disks having tubular portions fixed to the hub and having outer portions bent to form transverse abutment surfaces lying substantially parallel to the axis of the wheel and fixed directly to the rim and lateral abutment surfaces lying substantially parallel to the vertical plane of the wheel and spaced inwardly from the lateral margins of the rim, and annular reinforcing rings extending edgewise vertically around the inner surfaces of rim within the spaces between said lateral abutment surfaces and the lateral margins of the rim, said rings being fixed at their outer peripheral edges to the rim and being arranged to lie in lateral abutting contact with and fixed to said lateral abutment surfaces of the disks.

2. A wheel of the character described comprising a hub, a cylindrical rim band, a pair of conical disks formed independent of the rim and arranged between the hub and rim, one on each side of the vertical center of the wheel, said disks having inner portions fixed to the hub and having outer portions bent to respectively form lateral abutment surfaces lying substantially parallel to the vertical plane of the wheel and spaced from and lying inside the lateral margins of the rim and transverse abutment surfaces lying substantially parallel to the axis of the wheel and bearing on and welded directly to the rim, and annular reinforcing rings extending edgewise vertically around the inner surface of the rim in the spaces between said lateral abutment surfaces and the lateral margins of the rim, said rings being welded at their outer peripheral edges to the rim and having their inner faces arranged to lie in lateral abutting contact with and welded to said lateral abutment surfaces of the disks.

3. A wheel of the character described comprising a hub, a cylindrical rim band, a pair of conical disks formed independent of the rim and arranged between the hub and rim, one on each side of the vertical center of the wheel, said disks comprising body portions converging relatively to each other from the hub toward the rim and having inner portions fixed to the hub and having outer portions first curved outwardly and radially to form annular channeled reinforcing ribs and then curved outwardly and radially and laterally inwardly to respectively form lateral abutment surfaces lying substantially parallel to the vertical plane of the wheel and spaced from and lying inside the lateral margins of the rim and transverse abutment surfaces lying substantially parallel to the axis of the wheel and bearing on and directly fixed to the rim, said rib and lateral and transverse abutment surfaces being extended outward from the body portions on a continuous sinuous line of curvature, and annular reinforcing rings extending edgewise vertically around the inner surface of the rim in the spaces between said lateral abutment surfaces and the lateral margins of the rim, said rings being fixed at their outer peripheral edges to the rim and being arranged to lie in lateral abutting contact with and fixed to said lateral abutment surfaces of the disks.

4. A wheel of the character described comprising a hub, a cylindrical rim band, a pair of conical disks formed independent of the rim and arranged between the hub and rim, one on each side of the vertical center of the wheel, said disks comprising body portions converging relatively to each other from the hub toward the rim and having inner portions fixed to the hub and having outer portions first curved outwardly and radially to form annular channeled reinforcing ribs and then curved outwardly and radially and laterally inwardly to respectively form lateral abutment surfaces lying substantially parallel to the vertical plane of the wheel and spaced from and lying inside the lateral margins of the rim and transverse abutment surfaces lying substantially parallel to the axis of the wheel and bearing on and directly welded to the rim, said rib and lateral and transverse abutment surfaces being extended outward from the body portions on a continuous sinuous line of curvature, and annular reinforcing rings extending edgewise vertically around the inner surface of the rim in the spaces between said lateral abutment surfaces and the lateral margins of the rim, said rings being welded at their outer peripheral edges to the rim and being arranged to lie in lateral abutting contact with and welded to said lateral abutment surfaces of the disks.

CHARLES S. ASH.